No. 780,519. PATENTED JAN. 24, 1905.
W. J. & J. R. MITCHELL.
PNEUMATIC TIRE.
APPLICATION FILED MAR. 18, 1904.
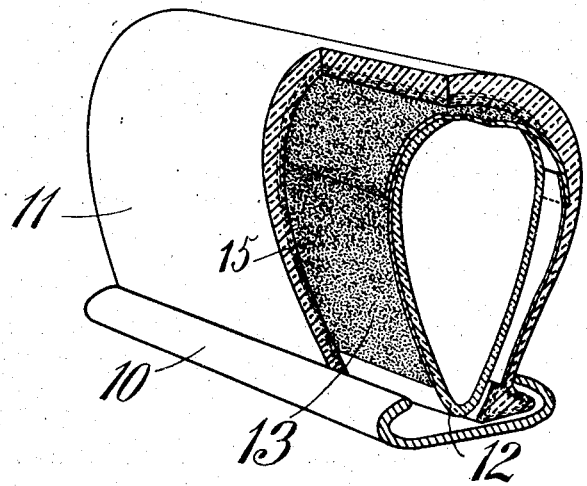
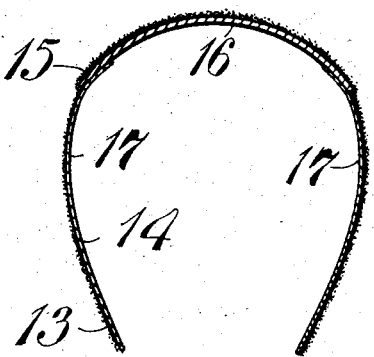
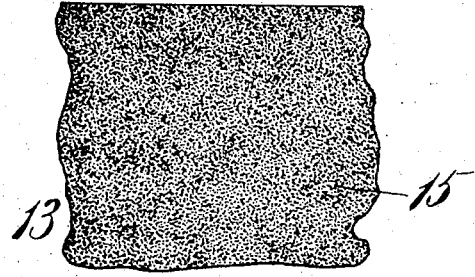
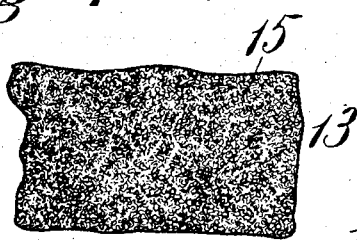
Witnesses:
A. C. Ratigan
R. Bullock
Inventors:
W. J. Mitchell
J. R. Mitchell
By Wright, Brown & Quinby
Attys.

No. 780,519.   Patented January 24, 1905.

UNITED STATES PATENT OFFICE.

WINFIELD J. MITCHELL AND JAMES R. MITCHELL, OF LYNN, MASSACHUSETTS, ASSIGNORS TO FLEXIBLE METAL MANUFACTURING COMPANY, OF LYNN, MASSACHUSETTS, A CORPORATION OF MASSACHUSETTS.

PNEUMATIC TIRE.

SPECIFICATION forming part of Letters Patent No. 780,519, dated January 24, 1905.

Application filed March 18, 1904. Serial No. 198,701.

*To all whom it may concern:*

Be it known that we, WINFIELD J. MITCHELL and JAMES R. MITCHELL, of Lynn, in the county of Essex and State of Massachusetts, have invented certain new and useful Improvements in Pneumatic Tires, of which the following is a specification.

The object of this invention is to provide a protector for pneumatic tires having the ability to resist puncture by pointed or sharp articles—such as nails, glass, &c.—and possessed of a maximum degree of flexibility, so as not to unduly interfere with the resiliency of the tire.

To this end the invention in its preferred embodiment comprises a protective layer or shoe incorporated in the wall of the tire in a suitable place—as, for instance, between the outer shoe or layer and the inner air-tube—and composed of an inner layer of flexible material, such as fabric; and an outer layer of comminuted metal, such as iron or steel, caused to adhere to the fabric base layer by means of cement or glue. The outer surface of the comminuted-metal layer is preferably polished to increase the liability of glancing of the point or edge of any sharp substance which penetrates the outer shoe or layer.

Of the accompanying drawings, Figure 1 represents a sectional perspective view of a portion of a pneumatic tire provided with our improvement. Fig. 2 represents a cross-section of the protective shoe. Fig. 3 represents a plan of the surface of the shoe before polishing. Fig. 4 represents a plan view of said surface after polishing.

The same reference characters indicate the same parts in all the figures.

In the drawings we have represented a detachable outer-shoe tire of ordinary form, 10 being the rim, and 11 the horseshoe or U shaped outer shoe, detachably interlocking with said rim and composed of rubber and fabric.

12 is the inner air-tube of rubber.

Loosely positioned between the outer shoe and air-tube is the protective shoe 13, substantially U-shaped in cross-section to conform to the tire and composed of a flexible base layer 14, preferably of fabric, such as canvas, and a comminuted-metal outer layer 15, composed, preferably, of powdered iron or steel and caused to adhere to the fabric layer by a suitable glue or cement. The outer surface of this layer 15 is preferably polished or smoothed, so as to present a surface against which any sharp-edged or pointed surface penetrating the outer shoe 11 will tend to glance off. In order to make a protective shoe without puckered inner edges and also to provide a relatively thick tread portion and relatively thin skirt or edge portions, the shoe 13 may be made of a middle tread-piece 16, of heavy duck or canvas, and side pieces 17, of a lighter canvas or fabric, stitched at their edges to the edges of the tread-piece. The tread-piece 16 will preferably be cut in the form of a straight strip, while the side pieces are cut from a flat strip in annular or semi-annular form to avoid puckered edges. It is obvious, however, that the fabric layer might be manufactured in the form of a woven tube, thickened, if desired, on the tread portion and cut or slit along its inner wall. In making the protective shoe any suitable method may be followed. For the shoe shown in the drawings we have found that a suitable method of manufacture is to provide an annular mandrel of the cross-sectional shape of a tire and lay the fabric layer of the shoe thereon. The fabric layer is then coated with glue or cement and a layer of powdered iron or steel applied thereto and preferably rolled in under considerable pressure. When the cement is dry, the mandrel and shoe are rotated like a wheel and an emery-stick held up to the comminuted-metal surface to smooth or polish the same.

A protective shoe constructed as herein described does not interfere to an appreciable extent with the resiliency of the tire and possesses a high degree of impenetrability. The protective shoe also overcomes any bulging or protrusion of the inner tube 12 through large holes or rents in the outer shoe, for the reason that it is inextensible and puncture and cut resisting.

It will be obvious that the invention is equally applicable to so-called "single-tube" or "hose-pipe" tires, in which the outer shoe is usually in the form of a tube vulcanized to the inner air-tube. In this form of tire the protective shoe 13 will likewise be preferably located between the outer and inner tubes, as in the illustration given, only somewhat more intimately united to these tubes by the process of vulcanization.

We claim—

1. A pneumatic tire containing in its wall a flexible layer of comminuted metal having a polished outer surface.

2. A pneumatic tire containing in its wall a protector composed of a flexible inner base layer, and a comminuted-metal outer layer adhering to said base layer and having a polished outer surface.

3. A protective shoe for pneumatic tires comprising a flexible-fabric base layer curved in cross-sectional outline to conform to the tire, and a comminuted-metal layer adhering to the outer surface of said base layer and having a polished outer surface.

In testimony whereof we have affixed our signatures in presence of two witnesses.

WINFIFLD J. MITCHELL.
JAMES R. MITCHELL.

Witnesses:
R. M. PIERSON,
A. C. RATIGAN.